United States Patent
Napier

(10) Patent No.: US 11,983,325 B1
(45) Date of Patent: May 14, 2024

(54) DIGITAL COMMUNICATION ASSEMBLY

(71) Applicant: Craig Napier, Bronx, NY (US)

(72) Inventor: Craig Napier, Bronx, NY (US)

( * ) Notice: Subject to any disclaimer, the term of this patent is extended or adjusted under 35 U.S.C. 154(b) by 0 days.

(21) Appl. No.: 18/106,862

(22) Filed: Feb. 7, 2023

(51) Int. Cl.
  *G06F 3/01* (2006.01)
  *G06F 3/16* (2006.01)

(52) U.S. Cl.
  CPC .............. *G06F 3/016* (2013.01); *G06F 3/014* (2013.01); *G06F 3/16* (2013.01)

(58) Field of Classification Search
  CPC ............. G06F 3/016; G06F 3/014; G06F 3/16
  See application file for complete search history.

(56) References Cited

U.S. PATENT DOCUMENTS

| | | | |
|---|---|---|---|
| 9,326,108 B2 | 4/2016 | Ungari | |
| D761,792 S | 7/2016 | Magi | |
| 9,989,997 B2 | 6/2018 | Magi | |
| 11,039,669 B2 | 6/2021 | Zrbley | |
| 2013/0309963 A1 | 11/2013 | Shasha | |
| 2015/0145674 A1 | 5/2015 | Rydfors | |
| 2015/0198454 A1* | 7/2015 | Moore | G01C 21/3652 701/428 |
| 2015/0198455 A1* | 7/2015 | Chen | G01C 21/3623 701/428 |
| 2015/0198941 A1* | 7/2015 | Pederson | G06F 3/017 700/275 |
| 2015/0199385 A1* | 7/2015 | Choi | H04N 1/00196 382/305 |
| 2015/0201181 A1* | 7/2015 | Moore | H04N 13/239 348/47 |
| 2018/0027310 A1 | 1/2018 | Magi | |

FOREIGN PATENT DOCUMENTS

WO WO2015099954 7/2015

* cited by examiner

*Primary Examiner* — Sejoon Ahn

(57) ABSTRACT

A digital communication assembly includes a first personal electronic device associated with a first user and a second personal electronic device associated with a second user. A first wrist band is provided that is worn by the first user and a second wrist band that is worn by the second user. A pair of touch screens is each integrated into a respective one of the wrist bands and a pair of communication units is each of the communication units is integrated into a respective one of the wrist bands. Each of the communication units communicates an alert signal to a respective one of the personal electronic devices. A respective personal electronic device broadcasts an alert signal to the communication unit in a respective wrist band to facilitate the second user to know that the first user is thinking about the second user in an affectionate manner and vice verse.

16 Claims, 5 Drawing Sheets

DIGITAL COMMUNICATION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to communication devices and more particularly pertains to a new communication device for facilitating haptic communication between individuals in real time. The device includes a pair of wrist bands and a pair of communication units integrated into a respective wrist band. The device includes a pair of personal electronic devices each in communication with a respective communication unit. The device includes a pair of touch screens each attached to a respective wrist band and a pair of vibration units each integrated into a respective wrist band. The vibration unit in a respective wrist band vibrates a respective individual's wrist when the touch screen in an opposing wrist band is touched.

(2) DESCRIPTION OF RELATED ART INCLUDING INFORMATION DISCLOSED UNDER 37 CFR 1.97 AND 1.98

The prior art relates to communication devices including a communication method that includes a pair of electronic devices for recording a brief verbal message that are each in communication with a respective relay radio. The prior art discloses a communication device that includes a wrist band and a flexible display integrated into the wrist band. The prior art discloses a communication device that includes a pair of bracelets that each includes a plurality of buttons that can be touched in a defined sequence and a pre-determined length of time to complete a shared activity across the pair of bracelets. The prior art discloses a vibration coded communication device that includes a parent device and a child device that each communicate a vibration encoded message to each other. The prior art discloses a communication device that includes a communication bracelet that can record and transmit a message to another bracelet, smart phone or cloud server. The prior art discloses a wearable electronic device that includes a bracelet and a plurality of charms attached to the bracelet which is in wireless communication with another bracelet via a personal electronic device.

BRIEF SUMMARY OF THE INVENTION

An embodiment of the disclosure meets the needs presented above by generally comprising a first personal electronic device associated with a first user and a second personal electronic device associated with a second user. A first wrist band is provided that is worn by the first user and a second wrist band that is worn by the second user. A pair of touch screens is each integrated into a respective one of the wrist bands and a pair of communication units is each of the communication units is integrated into a respective one of the wrist bands. Each of the communication units communicates an alert signal to a respective one of the personal electronic devices. A respective personal electronic device broadcasts an alert signal to the communication unit in a respective wrist band to facilitate the second user to know that the first user is thinking about the second user in an affectionate manner and vice verse.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
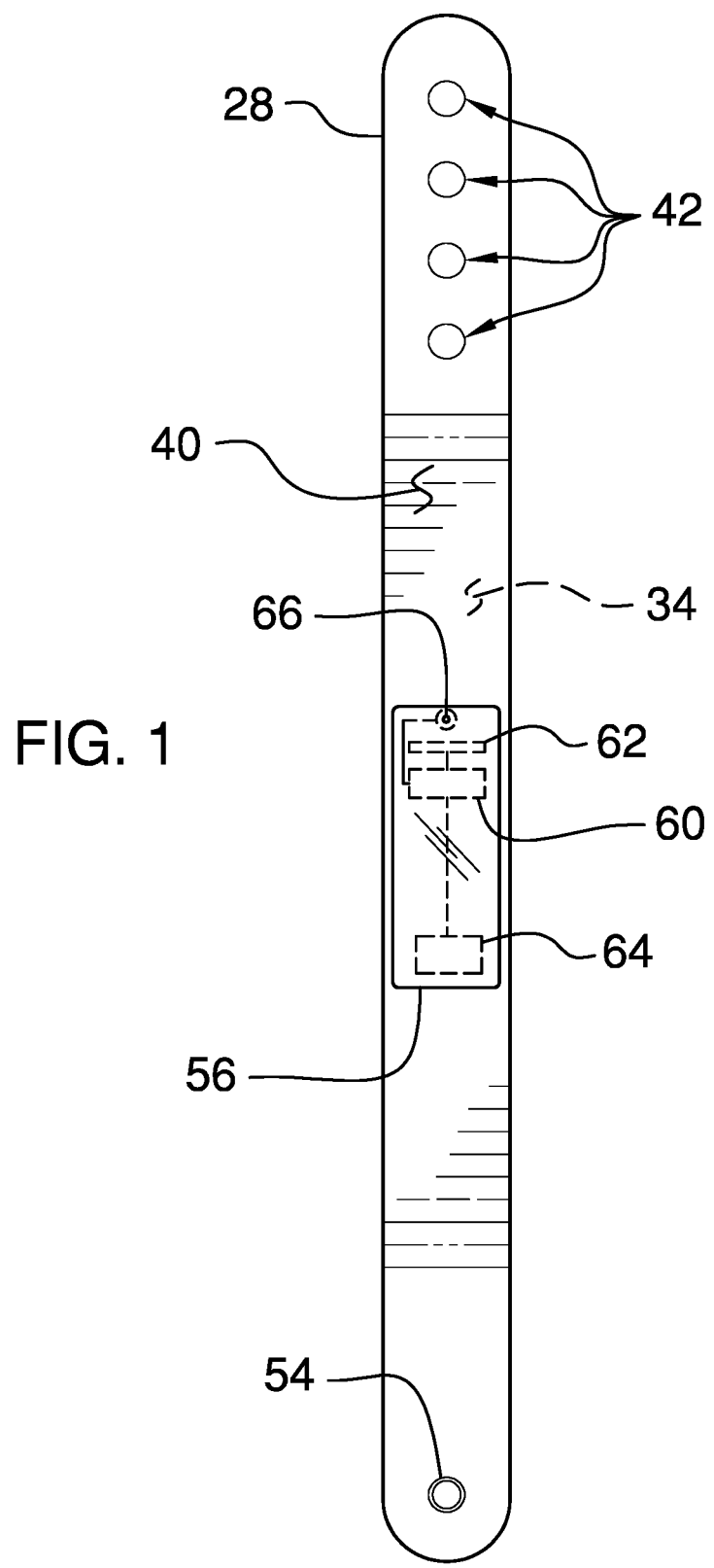
FIG. 1 is a top phantom view of a digital communication assembly according to an embodiment of the disclosure.

With reference now to the drawings, and in particular to FIGS. 1 through 5 thereof, a new communication device embodying the principles and concepts of an embodiment of the disclosure and generally designated by the reference numeral 10 will be described.

As best illustrated in FIGS. 1 through 5, the digital communication assembly 10 generally comprises a pair of personal electronic devices 12 that is each employed by respective one of a first user 14 and a second user 16. Each of the personal electronic devices 12 includes a transceiver 18 and a display 20 for displaying indicia comprising icons and words. Additionally, each of the personal electronic devices 12 stores a communication program 22. The pair of personal electronic devices 12 includes a first personal electronic device 24 associated with the first user 14 and a second personal electronic device 26 associated with the second user 16. Each of the personal electronic devices 12 may comprise a smart phone or other similar type of electronic device and the communication program 22 may comprise a smart phone app.

A pair of wrist bands 28 is provided and each of the wrist bands 28 is wearable around a respective one of the first user's wrist 30 and the second user's wrist 32 thereby facilitating each of the wrist bands 28 to be in physical contact with the respective first user 14 and the second user 16. Each of the wrist bands 28 has a lower surface 34 which abuts the respective first user's skin 36 and the second user's skin 38 when the wrist bands 28 are worn around the respective first user's wrist 30 and the second user's wrist 32. Each of the wrist bands 28 has an upper surface 40 that is visible to the respective first user 14 and the second user 16 and each of the wrist bands 28 has a plurality of holes 42 each extending through the upper surface 40 and the lower surface 34 of a respective wrist band 28. The holes 42 in the respective wrist band 28 are spaced apart from each other and are distributed from a first end 46 of the respective wrist band 28 toward a second end 48 of the respective wrist band 28.

The pair of wrist bands 28 includes a first wrist band 50 that is associated with the first user 14 and a second wrist band 52 that is associated with the second user 16. A pair of knobs 54 is each attached to the upper surface 40 of a respective one of the wrist bands 28. Each of the knobs 54 is insertably through a respective one of the holes 42 in the respective wrist band 28 for retaining the respective wrist band 28 in a closed loop around the respective first user's wrist 30 and the second user's wrist 32. A pair of touch screens 56 is each integrated into a respective one of the wrist bands 28 thereby facilitating each of the touch screens 56 to be touched by the respective first user 14 and second user 16. Each of the touch screens 56 may comprise an electronic touch screen such as a liquid crystal display or the like.

A pair of communication units 58 is provided and each of the communication units 58 is integrated into a respective one of the wrist bands 28. Each of the communication units 58 is in remote communication with a respective one of the personal electronic devices 12. The touch screen 56 in a respective one of the wrist bands 28 is in communication with the communication unit 58 in the respective wrist band 28. Additionally, the communication unit 58 in the respective wrist band 28 communicates an alert signal to a respective one of the personal electronic devices 12 when the touch screen 56 in the respective wrist band 28 is touched. Furthermore, a respective one of the personal electronic devices 12 broadcasts an alert signal to the communication unit 58 in a respective wrist band 28 when the respective personal electronic device 12 receives the alert signal. In this way the communication unit 58 in the respective wrist band 28 facilitates the second user 16 to know that the first user 14 is thinking about the second user 16 in an affectionate manner or to facilitate the first user 14 to know that the second user 16 is thinking about the first user 14 in an affectionate manner. As is most clearly shown in FIG. 4, indicia 53 may be applied to each of the touch screens 56 which may comprise the words "love taps" 55 as well an image of a heart 57.

The communication unit 58 in each of the wrist bands 28 comprises a control circuit 60 that is integrated into the respective the wrist band 28. The control circuit 60 receives a broadcast input and the control circuit 60 in the respective wrist band 28 receives an alert input. The touch screen 56 in the respective wrist band 28 is electrically coupled to the control circuit 60 in the respective wrist band 28. Moreover, the control circuit 60 in the respective wrist band 28 receives the broadcast input when the touch screen 56 in the respective wrist band 28 is touched.

The communication unit 58 in each wrist band 44 includes a transceiver 62 that is integrated into the respective wrist band 28. The transceiver 62 in the respective wrist band 28 is electrically coupled to the control circuit 60 in the respective wrist band 28. The transceiver 62 in the first wrist band 50 broadcasts the alert signal to the second personal electronic device 26 when the control circuit 60 in the first wrist band 50 receives the broadcast input. The second personal electronic device 26 broadcasts an alert command to the transceiver 62 in the second wrist band 52 when the second personal electronic device 26 receives the alert signal. The control circuit 60 in the second wrist band 52 receives the alert input when the transceiver 62 in the second wrist band 52 receives the alert command.

The transceiver 62 in the second wrist band 52 broadcasts the alert signal to the first personal electronic device 24 when the control circuit 60 in the second wrist band 52 receives the broadcast input. The first personal electronic device 24 broadcasts an alert command to the transceiver 62 in the first wrist band 50 when the first personal electronic device 24 receives the alert signal. Furthermore, the control circuit 60 in the first wrist band 50 receives the alert input when the transceiver 62 in the first wrist band 50 receives the alert command. The transceiver 62 associated with each of the first wrist band 50 and the second wrist band 52 may comprise a radio frequency transceiver 62 or the like and transceiver 62 in each of the first wrist band 50 and the second wrist band 52 may employ Bluetooth communication protocols.

The communication unit 58 in each of the respective wrist bands 28 includes a vibration unit 64 that is integrated into the respective wrist band 28. The vibration unit 64 in the respective wrist band 28 is electrically coupled to the control circuit 60 in the respective wrist band 28. Additionally, the vibration unit 64 in the respective wrist band 28 is in mechanical communication with the lower surface 34 of the respective wrist band 28 such that the vibration unit 64 in the respective wrist band 28 vibrates the respective user's skin when the vibration unit 64 in the respective wrist band 28 is turned on. The vibration unit 64 in the first wrist band 50 is actuated when the control circuit 60 in the first wrist band 50 receives the alert input. Furthermore, the vibration unit 64 in the second wrist band 52 is turned on when the control circuit 60 in the second wrist band 52 receives the alert input.

The communication unit 58 in each of the respective wrist bands 28 includes a speaker 66 that is integrated into the respective wrist band 28. The speaker 66 in the respective wrist band 28 is electrically coupled to the control circuit 60 in the respective wrist band 28. The speaker 66 in the first wrist band 50 is turned on to emit an audible alert when the control circuit 60 in the first wrist band 50 receives the alert input. Additionally, the speaker 66 in the second wrist band 52 is turned on to emit an audible alert when the control circuit 60 in the second wrist band 52 receives the alert input. The communication unit 58 in each of the respective wrist bands 28 includes a power supply 68 that is integrated into a respective wrist band 28. The power supply 68 in the respective wrist band 28 is electrically coupled to the control circuit 60 in the respective wrist band 28 and the power supply 68 comprises at least one battery 70.

Figure 2:
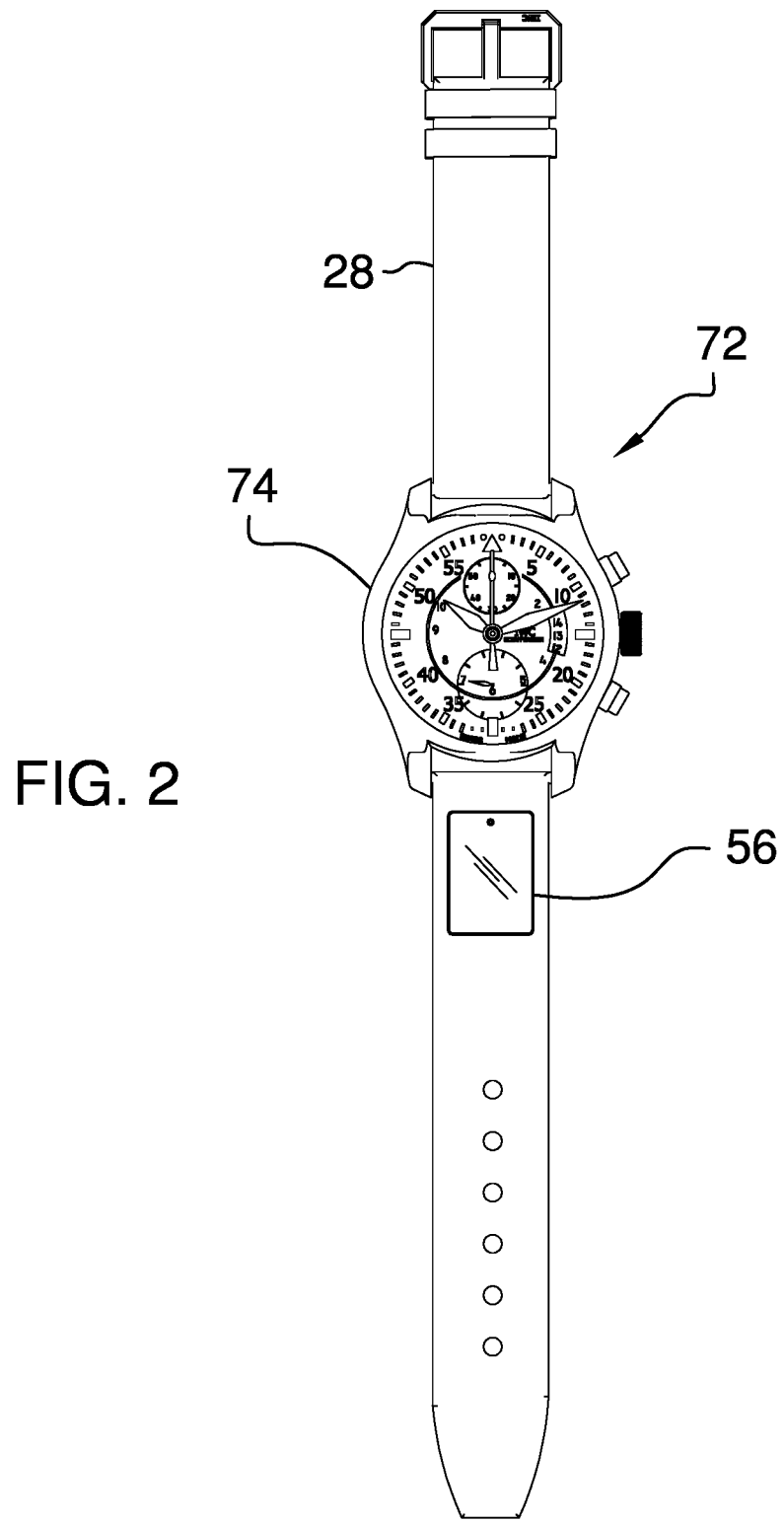
FIG. 2 is a top perspective view of an alternative embodiment of the disclosure.
Figure 3:
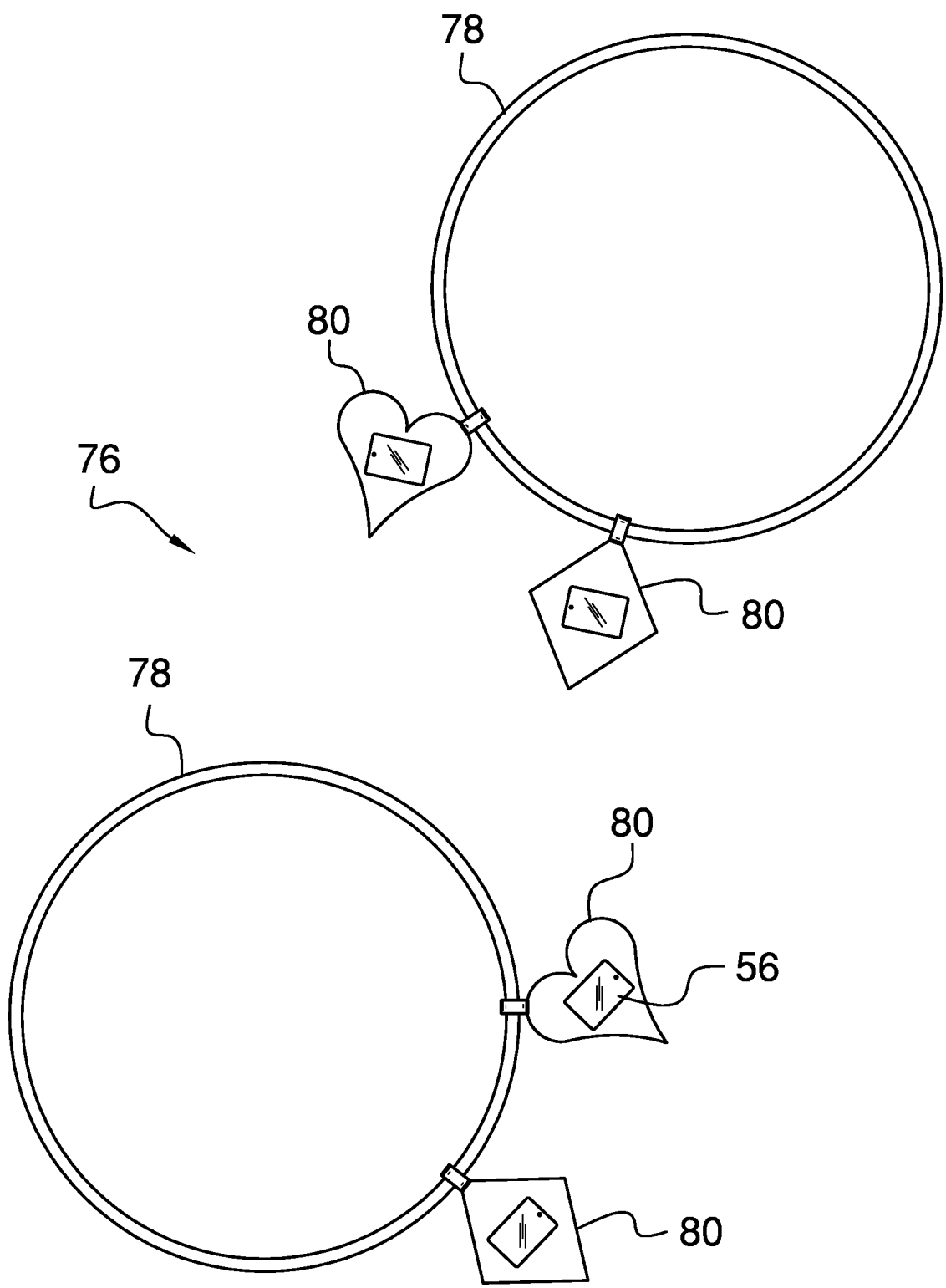
FIG. 3 is a perspective view of an alternative embodiment of the disclosure.
Figure 4:
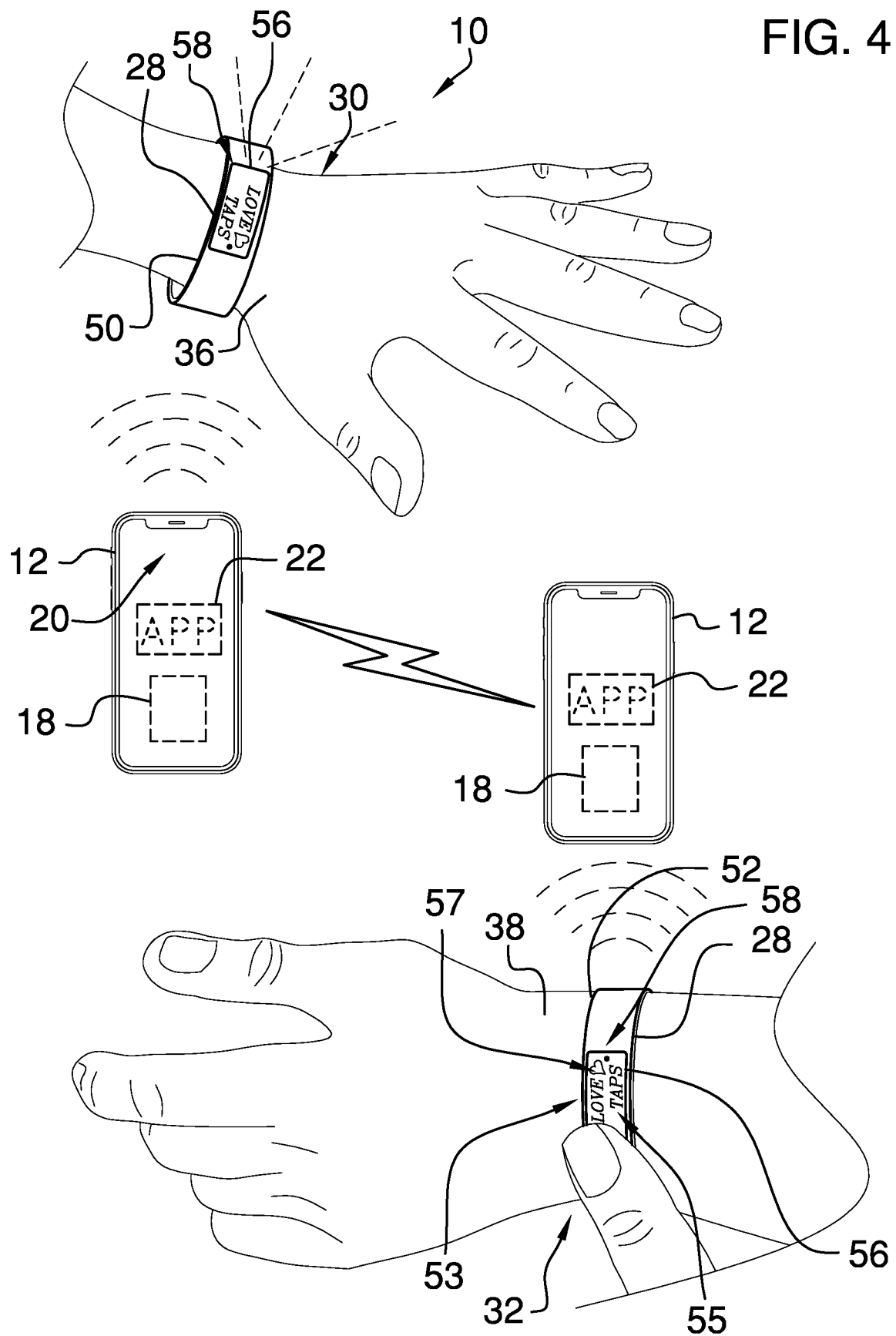
FIG. 4 is a perspective in-use view of an embodiment of the disclosure.
Figure 5:
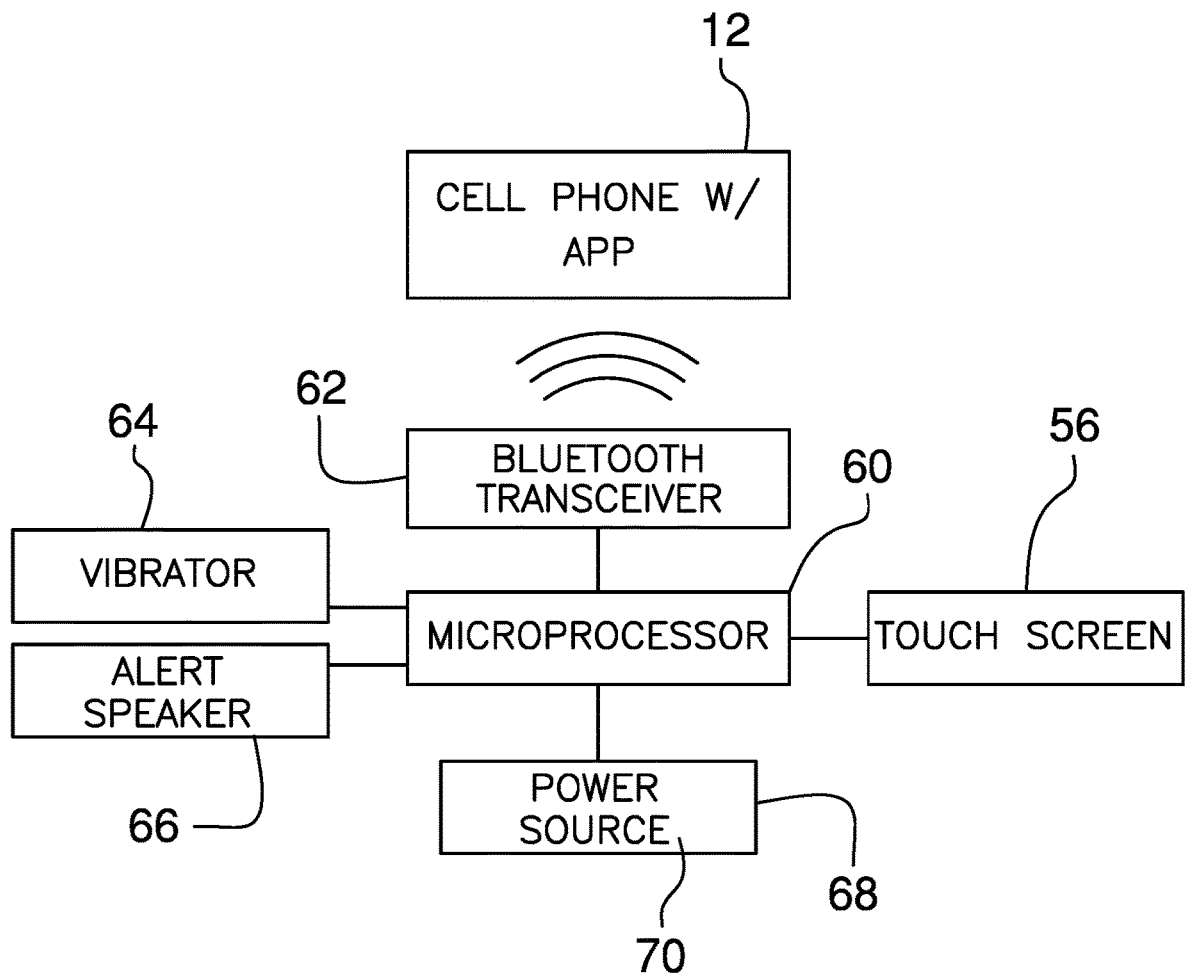
FIG. 5 is a schematic view of an embodiment of the disclosure.

In an alternative embodiment 72 as is most clearly shown in FIG. 2, each of the wrist bands 28 includes a wrist watch 74 that is integrated into the wrist bands 28. The wrist watch 74 may comprise a digital wrist watch, an analog wrist watch or any other type of conventional timepiece. In an alternative embodiment 76 as is most clearly shown in FIG. 3, a pair of bracelets 78 may be provided that is each wearable around a respective one of the first user's wrist 30 and the second user's wrist 32. A plurality of charms 80 may each be movably attached to a respective one of the bracelets 78. Additionally, each of the communication units 58 is attached to a respective one of the charms 80 on a respective one of the bracelets 78.

In use, the first user 14 taps the touch screen on the first wrist band 50 when the first user 14 wishes to communicate to the second user 16 that the first user 14 is thinking about the second user 16. The vibration unit 64 in the second wrist band 52 vibrates against the second user's wrist 32 to let the second user 16 know that the first user 14 is thinking of them. The second user 16 taps the touch screen 56 on the second wrist band 52 when the second user 16 wishes to communicate to the first user 14 that the second user 16 is thinking about the first user 14. The vibration unit 64 in the first wrist band 50 vibrates against the first user's wrist 30 to let the first user 14 know that the second user 16 is thinking of them. In this way the first wrist band 50 and the second wrist band 52 facilitate the first user 14 and the second user 16 to communicate in real time without the need to send a text message or a phone call. Furthermore, the first personal electronic device 24 can be employed to track the location of the second wrist band 52 and the second personal electronic device 26 can be employed to track the location of the first wrist band 50.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A digital communication assembly for sending a haptic message between users, said assembly comprising:

a pair of personal electronic devices, each of said personal electronic devices being employed by respective one of a first user and a second user, each of said personal electronic devices including a receiver and a display for displaying indicia comprising icons and words, each of said personal electronic devices storing a communication program, said pair of personal electronic devices including a first personal electronic device being associated with the first user and a second personal electronic device being associated with the second user;

a pair of wrist bands, each of said wrist bands being wearable around a respective one of the first user's wrist and the second user's wrist thereby facilitating each of said wrist bands to be in physical contact with the respective first user and the second user, each of said wrist bands having a lower surface which abuts the respective first user's skin and the second user's skin when said wrist bands is worn around the respective first user's wrist and the second user's wrist, said pair of wrist bands including a first wrist band being associated with the first user and a second wrist band being associated with the second user;

a pair of touch screens, each of said touch screens being integrated into a respective one of said wrist bands thereby facilitating each of said touch screens to be touched by the respective first user and second user; and a pair of communication units, each of said communication units being integrated into a respective one of said wrist bands, each of said communication units being in remote communication with a respective one of said personal electronic devices, said touch screen in a respective one of said wrist bands being in communication with said communication unit in said respective wrist band, said communication unit in said respective wrist band communicating an alert signal to a respective one of said personal electronic devices when said touch screen in said respective wrist band is touched, a respective one of said personal electronic devices broadcasting an alert signal to said communication unit in a respective wrist band when said respective personal electronic device receives said alert signal wherein said communication unit in said respective wrist band is configured to facilitate the second user to know that the first user is thinking about the second user in an affectionate manner or to facilitate the first user to know that the second user is thinking about the first user in an affectionate manner.

2. The assembly according to claim 1, wherein:

each of said wrist bands has an upper surface that is visible to the respective first user and the second user, each of said wrist bands having a plurality of holes each extending through said upper surface and said lower surface of a respective wrist band, said holes in said respective wrist band being spaced apart from each other and being distributed from a first end of said respective wrist band toward a second end of said respective wrist band, and said assembly includes a pair of knobs, each of said knobs being attached to said upper surface of said a respective one of said wrist bands, each of said knobs being insertably through a respective one of said holes in said respective wrist band for retaining said respective wrist band in a closed loop around the respective first user's wrist and the second user's wrist.

3. The assembly according to claim 1, wherein said communication unit in each of said wrist bands comprises a control circuit being integrated into said respective said wrist band, said control circuit receiving a broadcast input, said control circuit in said respective wrist band receiving an alert input, said touch screen in said respective wrist band being electrically coupled to said control circuit in said respective wrist band, said control circuit in said respective wrist band receiving said broadcast input when said touch screen in said respective wrist band is touched.

4. The assembly according to claim 3, wherein each of said communication units includes a transceiver being integrated into said respective wrist band, said transceiver in said respective wrist band being electrically coupled to said control circuit in said respective wrist band.

5. The assembly according to claim 4, wherein said transceiver in said first wrist band broadcasts said alert signal to said second personal electronic device when said control circuit in said first wrist band receives said broadcast input, said second personal electronic device broadcasting an alert command to said transceiver in said second wrist band when said second personal electronic device receives said alert signal, said control circuit in said second wrist band receiving said alert input when said transceiver in said second wrist band receives said alert command.

6. The assembly according to claim 4, wherein said transceiver in said second wrist band broadcasts said alert signal to said first personal electronic device when said control circuit in said second wrist band receives said broadcast input, said first personal electronic device broadcasting an alert command to said transceiver in said first wrist band when said first personal electronic device receives said alert signal, said control circuit in said first wrist band receiving said alert input when said transceiver in said first wrist band receives said alert command.

7. The assembly according to claim 4, wherein each of said communication units includes a vibration unit being integrated into said respective wrist band, said vibration unit in said respective wrist band being electrically coupled to said control circuit in said respective wrist band, said vibration unit in said respective wrist band being in mechanical communication with said lower surface of said respective wrist band such that said vibration unit in said respective wrist band vibrates the respective user's skin when said vibration unit in said respective wrist band is turned on.

8. The assembly according to claim 7, wherein said vibration unit in said first wrist band is actuated when said control circuit in said first wrist band receives said alert input.

9. The assembly according to claim 7, wherein said vibration unit in said second wrist band is turned on when said control circuit in said second wrist band receives said alert input.

10. The assembly according to claim 4, wherein each of said communication units includes a speaker being integrated into said respective wrist band, said speaker in said respective wrist band being electrically coupled to said control circuit in said respective wrist band.

11. The assembly according to claim 10, wherein said speaker in said first wrist band is turned on to emit an audible alert when said control circuit in said first wrist band receives said alert input.

12. The assembly according to claim 10, wherein said speaker in said second wrist band is turned on to emit an audible alert when said control circuit in said second wrist band receives said alert input.

13. The assembly according to claim 4, wherein each of said communication units includes a power supply being integrated into a respective wrist band, said power supply in said respective wrist band being electrically coupled to said control circuit in said respective wrist band, said power supply comprising at least one battery.

14. A digital communication assembly for sending a haptic message between users, said assembly comprising:

a pair of personal electronic devices, each of said personal electronic devices being employed by respective one of a first user and a second user, each of said personal electronic devices including a receiver and a display for displaying indicia comprising icons and words, each of said personal electronic devices storing a communication program, said pair of personal electronic devices including a first personal electronic device being associated with the first user and a second personal electronic device being associated with the second user;

a pair of wrist bands, each of said wrist bands being wearable around a respective one of the first user's wrist and the second user's wrist thereby facilitating each of said wrist bands to be in physical contact with the respective first user and the second user, each of said wrist bands having a lower surface which abuts the respective first user's skin and the second user's skin when said wrist bands is worn around the respective first user's wrist and the second user's wrist, each of said wrist bands having an upper surface that is visible to the respective first user and the second user, each of said wrist bands having a plurality of holes each extending through said upper surface and said lower surface of a respective wrist band, said holes in said respective wrist band being spaced apart from each other and being distributed from a first end of said respective wrist band toward a second end of said respective wrist band, said pair of wrist bands including a first wrist band being associated with the first user and a second wrist band being associated with the second user;

a pair of knobs, each of said knobs being attached to said upper surface of said a respective one of said wrist bands, each of said knobs being insertably through a respective one of said holes in said respective wrist band for retaining said respective wrist band in a closed loop around the respective first user's wrist and the second user's wrist;

a pair of touch screens, each of said touch screens being integrated into a respective one of said wrist bands thereby facilitating each of said touch screens to be touched by the respective first user and second user;

a pair of communication units, each of said communication units being integrated into a respective one of said wrist bands, each of said communication units being in remote communication with a respective one of said personal electronic devices, said touch screen in a respective one of said wrist bands being in communication with said communication unit in said respective wrist band, said communication unit in said respective wrist band communicating an alert signal to a respective one of said personal electronic devices when said touch screen in said respective wrist band is touched, a respective one of said personal electronic devices broadcasting an alert signal to said communication unit in a respective wrist band when said respective personal electronic device receives said alert signal wherein said communication unit in said respective wrist band is configured to facilitate the second user to know that the first user is thinking about the second user in an affectionate manner or to facilitate the first user to know that the second user is thinking about the first user in an affectionate manner, said communication unit in each of said wrist bands comprising:
- a control circuit being integrated into said respective said wrist band, said control circuit receiving a broadcast input, said control circuit in said respective wrist band receiving an alert input, said touch screen in said respective wrist band being electrically coupled to said control circuit in said respective wrist band, said control circuit in said respective wrist band receiving said broadcast input when said touch screen in said respective wrist band is touched;
- a transceiver being integrated into said respective wrist band, said transceiver in said respective wrist band being electrically coupled to said control circuit in said respective wrist band, said transceiver in said first wrist band broadcasting said alert signal to said second personal electronic device when said control circuit in said first wrist band receives said broadcast input, said second personal electronic device broadcasting an alert command to said transceiver in said second wrist band when said second personal electronic device receives said alert signal, said control circuit in said second wrist band receiving said alert input when said transceiver in said second wrist band receives said alert command, said transceiver in said second wrist band broadcasting said alert signal to said first personal electronic device when said control circuit in said second wrist band receives said broadcast input, said first personal electronic device broadcasting an alert command to said transceiver in said first wrist band when said first personal electronic device receives said alert signal, said control circuit in said first wrist band receiving said alert input when said transceiver in said first wrist band receives said alert command;
- a vibration unit being integrated into said respective wrist band, said vibration unit in said respective wrist band being electrically coupled to said control circuit in said respective wrist band, said vibration unit in said respective wrist band being in mechanical communication with said lower surface of said respective wrist band such that said vibration unit in said respective wrist band vibrates the respective user's skin when said vibration unit in said respective wrist band is turned on, said vibration unit in said first wrist band being actuated when said control circuit in said first wrist band receives said alert input, said vibration unit in said second wrist band being turned on when said control circuit in said second wrist band receives said alert input;
- a speaker being integrated into said respective wrist band, said speaker in said respective wrist band being electrically coupled to said control circuit in said respective wrist band, said speaker in said first wrist band being turned on to emit an audible alert when said control circuit in said first wrist band receives said alert input, said speaker in said second wrist band being turned on to emit an audible alert when said control circuit in said second wrist band receives said alert input; and
- a power supply being integrated into a respective wrist band, said power supply in said respective wrist band being electrically coupled to said control circuit in said respective wrist band, said power supply comprising at least one battery.

15. The assembly according to claim 14, wherein each of said wrist bands includes a wrist watch being integrated into said wrist bands.

16. The assembly according to claim 14, further comprising:
- a pair of bracelets each being wearable around a respective one of the user's wrists; and
- a plurality of charms, each of said charms being movably attached to a respective one of said bracelets, each of said communication units being attached to a respective one of said charms on a respective one of said bracelets.

* * * * *